Jan. 15, 1963

H. S. JONES 3,073,957

MULTIPLE ELEMENT INFRARED DETECTOR

Filed Sept. 22, 1955

INVENTOR.
HARRY S. JONES
BY
ATTORNEYS

Jan. 15, 1963  H. S. JONES  3,073,957
MULTIPLE ELEMENT INFRARED DETECTOR
Filed Sept. 22, 1955  3 Sheets-Sheet 2

INVENTOR.
HARRY S. JONES
BY
ATTORNEYS

Jan. 15, 1963 H. S. JONES 3,073,957
MULTIPLE ELEMENT INFRARED DETECTOR
Filed Sept. 22, 1955 3 Sheets-Sheet 3
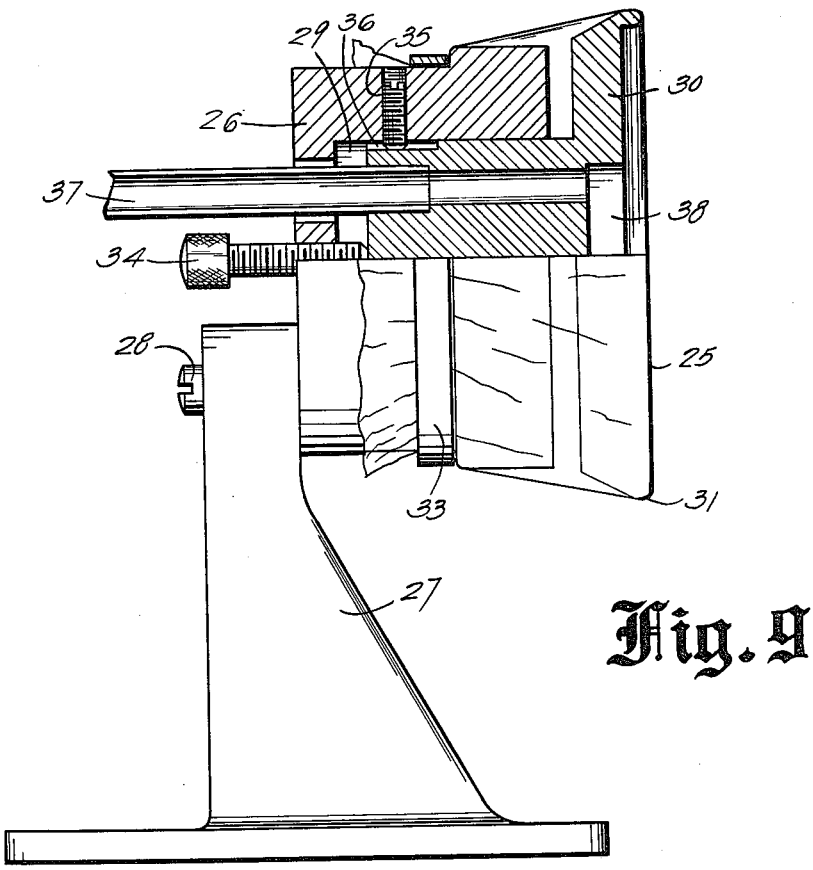
Fig. 9
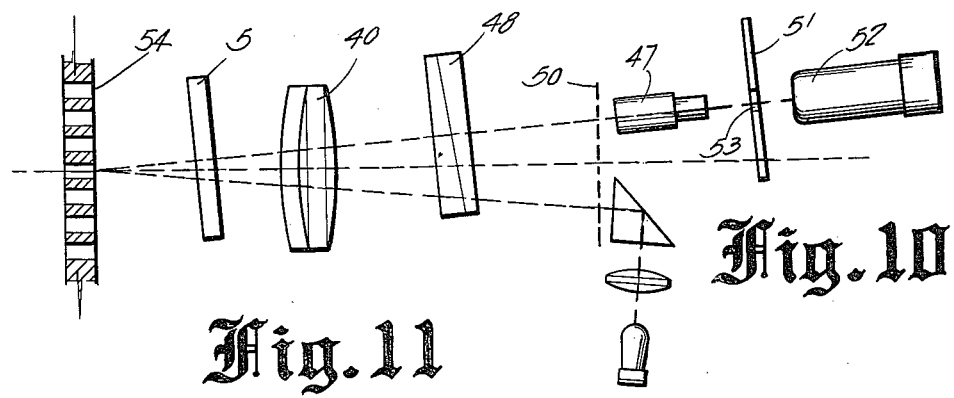
Fig. 10
Fig. 11
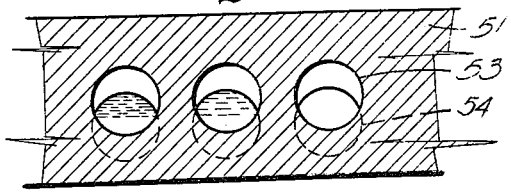
INVENTOR.
HARRY S. JONES
BY
ATTORNEYS 9,073,957
Patented Jan. 15, 1963

3,073,957
MULTIPLE ELEMENT INFRARED DETECTOR
Harry S. Jones, East Orange, N.J., assignor, by mesne assignments, to the United States of America, as represented by the Secretary of the Navy
Filed Sept. 22, 1955, Ser. No. 536,055
7 Claims. (Cl. 250—83.3)

This invention relates to apparatus for detecting and observing infrared images and more particularly to a new and improved multiple element pneumatic type infrared detector with a critical optical system for clearly observing infrared targets.

Present and previous infrared detection apparatus are capable of detecting close objects placed directly in front of sensing means; however, the prior art devices cannot be satisfactorily used for viewing normally existing images of low infrared intensity in the world around us.

It is, accordingly, an object of my invention to overcome the above and other defects in present and previous type infrared detectors, and it is more particularly an object of my invention to provide a new apparatus which is more sensitive to infrared rays than any of the prior art devices.

It is another object of this invention to provide an improved critical optical system for amplifying and visually displaying infrared images.

It is a particular object of the present invention to provide a device for the detection of small targets on larger, non-uniform backgrounds.

Another object of my invention is to provide an infrared detector which will be adapted for quantity production and operation under the severe conditions of service use.

It is a further object of this invention to provide a simplified transducer for converting an infrared image which is generally invisible at night to a visible image.

According to the preferred form of the present invention there is provided a plurality of infrared sensitive cells. Gold black particles located in each cell transform received infrared energy to heat so as to cause an expansion of the gas within the cells. One side of each cell is formed as a flexible mirror which bulges in accordance with changes of gas pressure within the cells. In order to clearly observe any changes in mirror curvature a critical optical system is provided for viewing visible light rays which are reflected by the flexible mirrors.

Other objects and advantages of my invention will become evident from the following detailed description taken in conjunction with the accompanying drawings, in which:

FIGURE 9 is a partial longitudinal sectional view of my novel flexible secondary mirror de-focusing modulator;

FIGURE 10 is a schematic diagram illustrating a phototube pickoff system; and

FIGURE 11 is an illustration of the aperture plate and mirror membranes as viewed from the phototube of the system shown in FIGURE 10.

Figure 1:
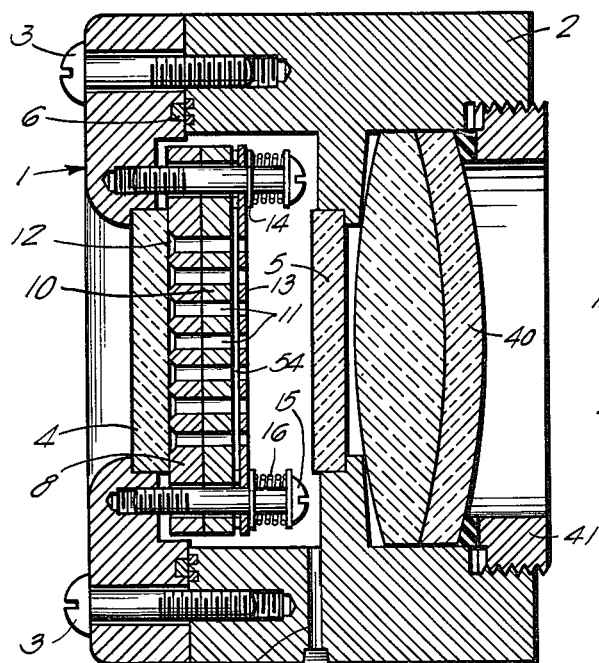
FIGURE 1 is a longitudinal sectional view of my novel multiple element cell assembly.
Figure 2:
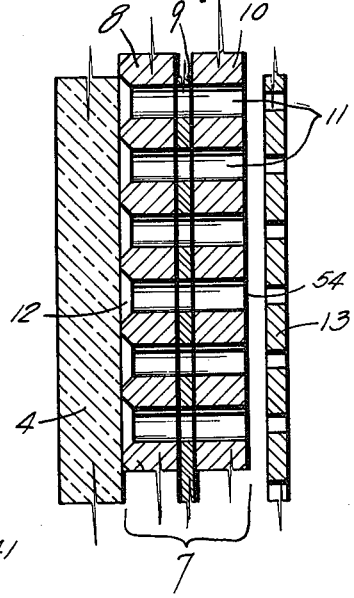
FIGURE 2 is an enlarged fragmentary section showing the details of a pneumatic infrared sensing cell.

Referring to FIGURES 1 and 2 the multiple element receiver comprises a housing having a body 2 and a head 1 secured thereto by means of screws 3. Head portion 1 includes a window 4 which is firmly sealed thereto. Body portion 2 of the housing includes a pressure tight window 5 which is displaced opposite to window 4 and is firmly sealed to said body portion so as to form a part thereof. A gasket ring seal 6 is provided between head portion 1 and body portion 2, in order to provide a pressure tight housing.

A plate 7 formed of a plurality of flat sections 8, 9 and 10 is mounted within housing 1, 2 and is provided with a plurality of transverse parallelly arranged bores 11. The left ends of the bores, as viewed in FIGURES 1 and 2, are provided with frustro-conical counter sunk portions 12 formed in plate section 8.

In a preferred embodiment end plate sections 8 and 10 are formed of glass or metal and central plate section 9 is a sheet of paper. Porous paper is used in order to allow gas leakage from bore to bore for a purpose to be more fully hereinafter disclosed.

A mirror masking plate 13 is spaced from plate 7 by washers 14 and the entire assembly including plate 7, washers 14, and mirror masking plate 13 is resiliently urged against infrared window 4 by means of screws 15 and springs 16. The coacting surfaces between window 4 and plate 8 are smooth enough so that an effective pressure seal is provided between bores 11 at the intersection of said surfaces. Window 4 provides an effective pressure closure for one of the ends of bores 11.

Mirror plate section 10 is provided with a mirror surface facing window 5. An extremely thin mirror film of amylacetate, flexible collodion, non-flexible collodion, gyptal and castor oil is positioned over the right ends of bores 11, as viewed in FIGURES 1 and 2, so as to provide a flexible closure 54 for the other end of said bores. Housing 1, 2 and multiple cells 11 may be filled with air or xenon.

Infrared absorbing particles are placed in bores 11 in order to convert the infrared energy passing through window 4 to heat and thereby cause expansion of the gas within bores 11. In a preferred embodiment the infrared absorbing particles are minute gold black particles. The gold black particles are coated on a thin film and the film is positioned inside of bores 11 at the bottom of counter bore 12. The films are spaced from window 4 in order to prevent the window from conducting the heat developed by the gold black particles.

In a further embodiment, it has been found desirable to deposit minute gold black particles on a suitable grid located in bores 11 in place of the hereinbefore mentioned films.

Bores 11 and their end closures in the form of window 4 and flexible films 54, together with the gold black absorber means spaced therein form pneumatic multiple infrared receiver cells. Since multiple element cells are very difficult to assemble with tightly sealed elements having a common mirror membrane position a controlled mutual gas leakage is provided between cells. This common leakage is obtained by the aforementioned plate section 9 which is a soft-finish paper placed between the mirror plate section 10 and the receiver plate section 8. Alternatively, plate 7 may be made of a porous material or a controlled roughness may be provided on one plate section surface in order to provide mutual leakage. It has been found that a target may be focused on one cell without significant spreading of the signal to the immediately surrounding elements due to leakage. It is estimated that the response of the immediately adjacent cells is in the order of less than 1% of the target element response; however, if a steady target is observed an undue amount of target signal will leak to adjacent cells. In order to observe steady targets it is therefore necessary to allow the target to be focused on a cell a limited period of time in order to limit target signal leakage to adjacent infrared pressure cells.

Figure 3:
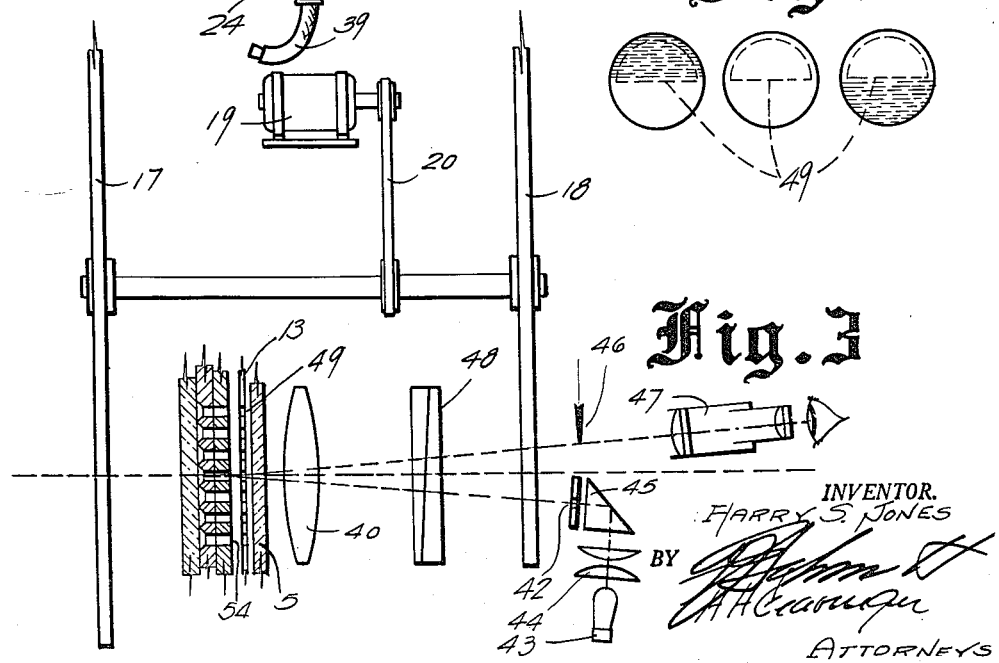
FIGURE 3 is a schematic diagram illustrating the critical optical system for the multiple element cell.

As viewed in FIGURE 3, a rotatable chopper plate 17 is provided for interrupting the flow of infrared rays from a target to a sensitive cell in order to control the time period a cell is exposed to infrared target rays. A second chopper plate 18 in the visual system, synchronized with the infrared chopper 17 may be utilized to enable the cells to be viewed only when they are unobstructed by chopper 17. A conventional motor 19 and conventional transmission means 20 may be provided for rotating the chopper plates.

Figure 5:
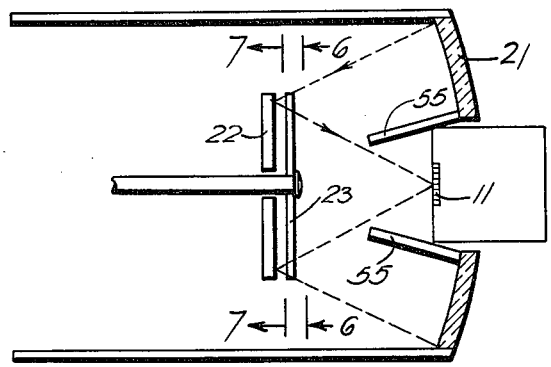
FIGURE 5 is a schematic diagram illustrating an optical system with a chopper plate for reflecting infrared rays onto a multiple cell assembly.
Figure 6:
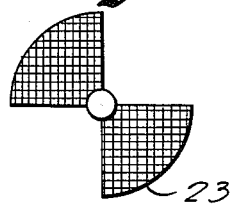
FIGURE 6 is a view taken on the plane indicated by the line 6—6 of FIGURE 5.
Figure 7:
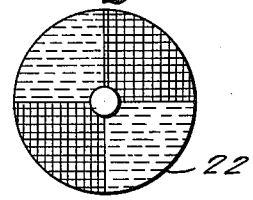
FIGURE 7 is a view taken on the plane indicated by the line 7—7 of FIGURE 5.

A preferred device for focusing infrared rays on the hereinbefore disclosed multi-element assembly is shown in FIGURE 5. As viewed in FIGURE 5, a Cassegrainian optical system comprising a curved primary mirror 21 and a flat secondary mirror 22 is provided for reflecting infrared rays to multiple cells 11. As shown by the dotted line arrows, infrared rays strike curved plate 21 are reflected to flat plate 22 and are then reflected to multiple cells 11—4—54. Ray shields 55 are provided for shielding the reflected infrared rays. As shown in FIGURE 7, secondary mirror 22 is circular and has two diametrically opposed mirrored quadrants and two other diametrically opposed blackened quadrants. As viewed in FIGURES 5 and 6, a segmental rotating chopper plate 23 is spaced in front of flat secondary mirror 22 for interrupting the infrared rays reflected from curved plate 21. The chopper speed and the mutual leakage time constant between the sensitive cells are so related that the mutual leakage time constant is equal to several times the chopper period and this leakage usually permits sufficiently rapid adjustment to background level changes. Background level variations which are too great or too rapid to be compensated by the mutual leakages may be compensated by manually or automatically controlled pressure changes applied to the pressure feedback duct 24 shown in FIGURE 1.

Figure 8:
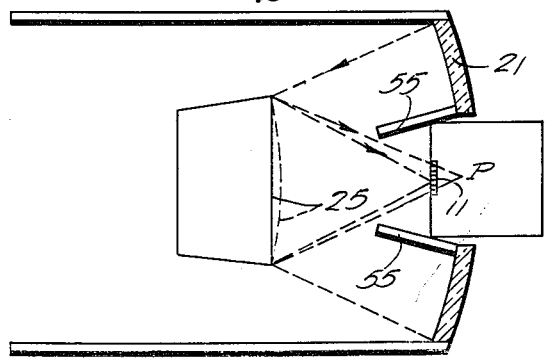
FIGURE 8 is a schematic diagram illustrating an optical system with a flexible secondary mirror for focusing and de-focusing reflected infrared rays onto a multiple cell assembly.

A further modification of a Cassegrainian optical system for focusing infrared rays on the hereinbefore disclosed multi-element assembly is shown in FIGURES 8 and 9. In this modification, a flexible mirror is provided for focusing and defocusing an infrared image on the detecting cells. Preferably, flexible secondary mirror 25 is provided for focusing and defocusing an infrared image on cells 11; however, if desired, mirror 21 may be made flexible. As viewed in FIGURE 9, flexible mirror 25 comprises a sheet of "Saran" approximately .0008" thick coated with evaporated aluminum. The means for mounting and adjusting flexible secondary mirror 25 includes a cylindrical body member 26 mounted on a convenient frame 27 by means of a screw 28. Body member 26 is provided with a large bore 29 for receiving a cylindrical flanged longitudinally adjustable fluid pressure device 30. Sheet 25 is stretched over a polished edge 31 of fluid pressure device 30, extended rearwardly over a flange 32 on body member 26 and clamped to body member 26 by means of clamp 33. A tension adjusting screw 34 is screwed into body member 26 for longitudinally adjusting fluid pressure device 30 to thereby adjust the tension of sheet 25. A clamping set screw 35 and keyway 36 are provided for clamping and fixing the rotational position of fluid pressure device 30 with respect to body member 26. Fluid pressure conduit 37 is secured to fluid pressure device 30 for conveying fluid to recess 38 to thereby bulge mirror 25 and defocus an infrared image. The desired fluid pressure modulation wave forms could be produced by a relatively simple electro-mechanical device similar to a dynamic speaker cone driven by an oscillator of suitable waveform. As viewed in FIGURE 8, the infrared rays, represented by dotted line arrows, are focused on multielement cells 11 when mirror 25 is flat and defocused or focused at point P when mirror 25 is bulged. The defocusing type modulator, viewed in FIGURES 8 and 9, provides infrared image modulation as well as compensation for undesired thermal background effects. This modulation alternately focuses and defocuses the infrared image upon the multiple element detector at the frame rate desired. In the defocused condition target points in the field will be defocused over such a large number of multiple cells that they will disappear, for all practical purposes, from the multiple cells they were originally focused upon. These same cells will, however, be actuated by radiation that is very close to the average radiation intensity of the field being viewed rather than radiation from the chopper, as occurs in the device shown in FIGURE 5. With leakage time constants somewhat longer than the frame exposure time the defocusing modulator system therefore compares all target points with the average radiation intensity of the infrared field being viewed.

The defocusing modulator of FIGURE 8 has at least two very important advantages over the chopper device shown in FIGURE 5. (1) When properly designed it does not discard half of the infrared energy and it therefore provides a system sensitivity gain of 2:1. (2) It can also be made to provide varying degrees of target discrimination if the defocusing is not 100% complete. For example, when defocusing is relatively slight only small targets are modulated effectively (and therefore detected) and large diffuse objects such as clouds or wide terrain areas are but slightly modulated. Only sharp edges of such objects, if present, will be detected. Such a system would therefore be most sensitive to small targets at extreme range, that is, targets covering only one or a few elements.

*Pressure Control Within the Multiple Cell Housing*

Pressure feedback involves the application of a common pressure to all multiple mirror elements 16 by means of pressure feedback duct 24 shown in FIGURE 1. Pressure feedback is necessary to restore mirror flatness when mirrors 16 are caused to bulge due to ambient temperature changes and any other non-target effects. As shown in FIGURE 1, a short length of ⅛" diameter plastic tubing 39 plugged at one end is provided for varying the gas pressure within housing 1, 2. Minute pressure changes may be produced by delicate finger pressure on tubing 39. Further, feedback pressure may be generated electronically in response to an increase in the average brightness of all the mirror elements detected by a single phototube and amplifier responsive to the integrated brightness of all mirror elements. Many simple devices such as a neon lamp, the heat output of which is directed to an auxiliary infrared receiver film in communication with the pressure feedback duct, can be used to generate feedback pressures in response to the amplified phototube output. Pressure feedback is one means for the elimination of undesired thermal background effects and also provides the means for nearly complete compensation of shock and vibration effects. This feature can be utilized in the multiple element pneumatic detector but not in the single element types since shock, vibration, and background changes affect all multiple elements equally and can be compensated in the manner outlined above whereas the visible image is formed in response to only the differences in intensity throughout the far infrared image focused upon the multiple elements and is not erased by such compensation.

*Optical Pickoff*

Referring now to FIGURE 1, an objective lens 40 held within body 2 by lens retainer means 41 is provided for directly viewing mirror films 54. A preferred critical optical system for viewing the infrared detector cells is shown in FIGURE 3. The critical optical system includes a pinhole 42 illuminated by a small light source 43 through a condenser lens 44 and 90° reflecting prism 45, a knife edge 46 and a telescope 47 for viewing the light reflected by mirrors 54. A rotatable achromatic wedge 48 may be provided for adjusting the optical system. The aforementioned mirror masking plate 14 is provided with semi-circular masking holes 49 to select the side of each mirror element 54 which produces a positive image.

Operation

In operation, an infrared image to be observed is focused on the multiple element cells by means of the Cassegrainian optical system shown in FIGURE 5 or 8. An infrared ray is reflected by curved primary mirror 21, proceeds to the secondary mirror and is then reflected by the secondary mirror through infrared window 4. In the device shown in FIGURE 5 the rays reflected by primary mirror 21 are interrupted or chopped by chopper 23. In the device shown in FIGURE 8 the rays reflected by mirror 21 are intermittently focused and defocused upon the infrared multiple cells by intermittent flexible mirror defocusing modulator 25. After passing through infrared transparent window 4, the infrared image is focused upon infrared receiver films 12 within each cell 11. The infrared radiant energy is converted to heat by the minute gold-black absorbing particles deposited upon the infrared receiver film and therefore the gas within cells 11 is expanded. This expansion causes mirror films 54 to bulge an amount proportional to the magnitude of the infrared energy focused upon the absorbing elements. These bulges may be concave or convex, depending upon the heat image pattern. The above mirror bulges are converted to corresponding intensities of visible light by an optical system as shown in FIGURE 3. Pinhole 42 is illuminated by a small light source 43 through a condenser lens 44 and reflecting prism 45. Light from the pinhole 42 passes through the objective lens 40, pressure-tight window 5, and mask holes and is reflected by the mirror elements 54 and mirror plate section 10 through the mask holes, pressure-tight window 5, and lens 40 past the knife-edge 46 to the viewing telescope 47 and into the observer's eye. When the mirrors are flat an image of the pin-hole will be sharply focused in the plane of the knife edge, provided the pinhole and knife edge are both located at a distance from the objective lens equal to the focal length of the lens. If the knife edge partly cuts the pinhole image the flat mirror elements will appear neutral grey. An element which receives a stronger (warmer) heat signal will cause its mirror to bulge to a convex shape and that mirror element will appear brighter than neutral grey and conversely, a cooler element will exhibit a concave bulge and appear darker than neutral grey.

Figure 4:
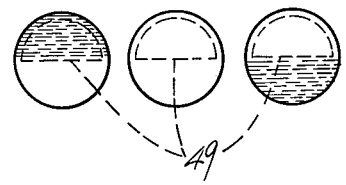
FIGURE 4 is an illustration of various infrared targets as viewed by the eye of an observer.

The appearance of these elements is shown in FIGURE 4. The outline of the mask holes, when used, is shown at 49. The darker leftmost illustration shows the appearance of a target which is cooler than background, the rightmost illustration shows a target which is warmer than background, and the center illustration shows a target at the same temperature as background.

Other Modifications

If desired, a multiplier phototube pick off system may be used to select any one of the mirror membranes and to observe the multiplier phototube response to the light modulation from an entire mirror element or from any smaller portion of a particular mirror element selected for study. As shown in FIGURE 10, the pinhole 42 and knife edge 46 of the device shown in FIGURE 3 are replaced by a grid 50; and an aperture plate 51 having holes 53 and multiplier phototube 52 are spaced in line with telescope 47. When the holes 53 in aperture plate 51 are concentric with mirror elements 54 no light modulation will occur since the light increase on one half of a mirror is equal to the light decrease on the opposite half. Therefore, holes 53 are displaced eccentric to mirror elements 54, as viewed in FIGURE 11, in order to provide for light modulation. This system obviates the necessity of mirror masking plate 13.

If desired, a photo-tube pickoff device may be used for guidance applications. Since electronic techniques make possible the detection of considerably smaller percentages of brightness modulation of a light source than are readily detectable by the human eye a multiple element guidance device has a substantially greater sensitivity (down to a fraction of a ° C.) than is possible with a multiple element direct viewer. Utilization of the defocusing type modulator with a pair of cells in a multiple cell pneumatic detector system to modulate the light which actuates a pair of photo-tubes in the familiar balanced push-pull type of circuit yields right or left or up or down signals for a servo amplifier in response to target position relative to the multiple receiver elements. One very desirable feature of such a system is that all multiple element microphonic effects actuate both elements equally and in phase and will therefore not cause a false signal since only unbalanced infrared signals will cause an amplifier output. Use of the defocusing type chopper will eliminate the effect of background level variations in the system as previously described.

As a further modification, a television pickoff system may be employed for high sensitivity viewing applications. A multiple element viewer having the same order of sensitivity (a fraction of a ° C.) as is obtained in the phototube target tracking system set forth above is provided. To obtain this high sensitivity, the multiple mirror elements are not viewed directly but are viewed by a standard TV camera with a modified video amplifier and viewing kinescope system in order to compensate for mirror noise effects. By synchronizing the TV frame rate with double the frame rate of the defocusing modulator the TV viewing system presents frames which alternately show the mirror element light intensities corresponding to the focused and to the defocused infrared image. If the polarity of the video signal is reversed whenever the multiple mirror elements respond to defocused infrared radiation the image presented on the kinescope viewer can, by adjustment of the TV brightness control, be made to show the infrared targets minus that type of multiple element mirror noise which is due to irreducible fabricating irregularities. This is possible since these mirror irregularities are independent of time over periods many times the frame exposure time. Since this steady state mirror noise is at present greater than the Brownian noise it is believed to be the practical limiting noise of the system as orthicon or vidicon noise should be adequately minimized by efficient optics, and, if necessary, more intense light sources. Lamps of only a fraction of a watt are now quite adequate for direct viewing by the human eye. The TV pickoff system eliminates the effect of all constant illumination, such as reflected from the areas of the mirror-support plate between mirror elements or from the mirror-masking plate. Such illumination will be compensated in the same manner as mirror noise.

It will be apparent that in addition to the increased sensitivity made possible through the use of the TV viewing system the TV system has the advantage that it accurately compensates for mirror noise every frame period. It does not require precision alignment of a photographed negative relative to an image of the mirror elements or the elements themselves and does not require the substitution of a new negative from time to time as the mirror noise pattern slowly fluctuates.

Obviously many modifications and variations of the present invention are possible in the light of the above teachings. It is therefore to be understood that within the scope of the appended claims the invention may be practiced otherwise than as specifically described.

What is claimed is:

1. An infrared imaging device comprising a housing, a plane infrared transparent window forming a portion of said housing for receiving infrared radiation, a plate having a plurality of transverse parallelly arranged bores positioned adjacent to said infrared lens within said housing, said plate including two relatively thick sections and a relatively thin porous section providing a gas leakage path for said bores positioned between said two relatively thick sections, flexible membranes fixed on opposite sides of said plate, the flexible membranes positioned in one side of said plate being sensitive to infrared radiation passing through said lens, the membranes positioned on the other side of said plate being light reflective and adapted to bulge upon an increase in pressure within said bores and a pressure tight window forming a portion of said housing located opposite to said lens and adjacent to said light reflective membrane for viewing said light reflective membranes.

2. An infrared imaging device as described in claim 1, wherein said flexible membranes are coated with minute gold-black particles.

3. An infrared imaging device as described in claim 1 comprising resilient means for urging said plate sections together and for urging said plate into sealing contact with said lens.

4. An infrared imaging device as described in claim 1, wherein said bores are cylinders having a frustro conical countersunk portion adjacent to said lens, the sensitive membranes being positioned at the bottom of said countersunk portion so as to be displaced from said lens.

5. An infrared imaging device comprising a housing, a plate having a plurality of transverse parallelly arranged bores positioned within said housing, said plate including two relatively thick sections and a relatively thin porous section positioned between said two relatively thick sections to provide for gas leakage between the bores, an infrared transparent lens forming a portion of said housing in sealing contact with one side of said plate to thereby form a closure for one of the ends of said bores, flexible membranes positioned on the other side of said plate forming closures for the other ends of said bores, said flexible membranes being light reflective, and means within said bores for converting infrared rays passing through said lens to heat to thereby cause expansion of the medium within said bores and flexing of said flexible membranes, and a chopper plate positioned in front of said lens to periodically interrupt the flow of infrared rays to said lens and converter transistor means.

6. An infrared imaging device comprising a gas filled cylindrical chamber sensitive to infrared energy, a circular flexible mirror portion on one of the ends of said gas filled chamber adapted to bulge an amount proportional to the magnitude of the infrared energy received by said gas filled chamber, a mirror masking plate having a semi-circular hole positioned adjacent to said mirror portion, and a critical optical system for viewing approximately one half of said flexible mirror portion comprising an objective lens positioned adjacent to said mirror masking plate, means for projecting a ray of light to said mirror portion through said objective lens, a telescope for viewing the light rays reflected by said mirror portion and a knife edge positioned approximately in the path of said reflected rays to shield said reflected rays from said telescope in accordance with the bulge of said mirror portions and proportional to the magnitude of the infrared energy received by the respective gas filled chambers.

7. An infrared imaging device comprising a plurality of gas filled chambers sensitive to infrared energy, a flexible mirror portion on each of said gas filled chambers adapted to flex in accordance with changes in infrared energy received by said gas filled chambers, and an infrared optical system for focusing infrared rays on said sensitive chambers comprising a curved primary mirror for receiving and reflecting infrared rays, a normally flat flexible secondary mirror for receiving the reflected rays from said curved mirror and focusing said reflected rays on said sensitive chambers, and deflecting mechanism for bulging said secondary mirror for defocusing said reflected rays.

References Cited in the file of this patent
UNITED STATES PATENTS

| | | |
|---|---|---|
| 1,781,799 | Baird | Nov. 18, 1930 |
| 2,422,971 | Kell et al. | June 24, 1947 |
| 2,424,976 | Golay et al. | Aug. 5, 1947 |
| 2,449,259 | Van Alphen | Sept. 14, 1948 |
| 2,456,801 | Tolson | Dec. 21, 1948 |
| 2,502,319 | Golay | Mar. 28, 1950 |
| 2,557,096 | Golay | June 19, 1951 |
| 2,562,864 | Jury et al. | July 31, 1951 |
| 2,673,297 | Miller | Mar. 23, 1954 |